(12) United States Patent
Westrick, Jr. et al.

(10) Patent No.: US 12,442,832 B2
(45) Date of Patent: Oct. 14, 2025

(54) WALL-MOUNTED CONTROLLER WITH ANTI-TAMPER FEATURE

(71) Applicant: ABL IP Holding LLC, Atlanta, GA (US)

(72) Inventors: Richard L. Westrick, Jr., Social Circle, GA (US); John R. Johnson, Flowery Branch, GA (US); Dylan A. D'Cruz, New Haven, CT (US)

(73) Assignee: ABL IP Holding LLC, Atlanta, GA (US)

( * ) Notice: Subject to any disclaimer, the term of this patent is extended or adjusted under 35 U.S.C. 154(b) by 338 days.

(21) Appl. No.: 18/085,890

(22) Filed: Dec. 21, 2022

(65) Prior Publication Data

US 2024/0210441 A1  Jun. 27, 2024

(51) Int. Cl.
*G01P 15/00* (2006.01)
*G01P 1/00* (2006.01)
*G06F 21/00* (2013.01)
*G08B 29/04* (2006.01)

(52) U.S. Cl.
CPC .............. *G01P 15/003* (2013.01); *G01P 1/06* (2013.01); *G06F 21/00* (2013.01); *G08B 29/046* (2013.01)

(58) Field of Classification Search
CPC .. G08B 29/046; G08B 13/1436; G08B 21/00; G08B 21/18; G08B 21/182; G08B 23/00; G01P 15/003; G01P 1/06; G06F 21/00
See application file for complete search history.

(56) References Cited

U.S. PATENT DOCUMENTS

| | | | |
|---|---|---|---|
| 2,174,140 A | 9/1939 | Schofield |
| 2,588,009 A | 3/1952 | Jones |
| 4,126,944 A | 11/1978 | Burkhart |
| 4,835,343 A | 5/1989 | Graef et al. |

(Continued)

FOREIGN PATENT DOCUMENTS

| | | |
|---|---|---|
| CN | 201918276 U | 8/2011 |
| CN | 205582763 U | 9/2016 |

(Continued)

OTHER PUBLICATIONS

"Max Paired Devices: 20", available at least as early as Dec. 21, 2022, 2 pages.

(Continued)

*Primary Examiner* — Brian Wilson
(74) *Attorney, Agent, or Firm* — Kilpatrick Townsend & Stockton LLP

(57) ABSTRACT

A method of operating a controller includes: obtaining calibration data for a mounting orientation of the controller operating in a calibration mode based on obtaining first acceleration samples from an acceleration sensor; obtaining second acceleration samples from the acceleration sensor when a control switch is activated with the controller operating in a normal operating mode; performing a comparison of the second acceleration samples to the calibration data; based on the comparison, determining whether more than one of the second acceleration samples is not within a specified range; and in response to determining that more than one of the second acceleration samples is not within the specified range, causing the controller to operate in an anti-tamper mode.

18 Claims, 7 Drawing Sheets

(56) References Cited

U.S. PATENT DOCUMENTS

| | | | |
|---|---|---|---|
| 4,924,349 A | 5/1990 | Buehler et al. | |
| 5,035,389 A | 7/1991 | Wang | |
| 5,239,205 A | 8/1993 | Hoffman et al. | |
| 5,458,311 A | 10/1995 | Holbrook | |
| 5,666,157 A * | 9/1997 | Aviv | H04N 5/76 |
| | | | 348/161 |
| 5,843,595 A | 12/1998 | Kawakatsu | |
| 5,895,888 A | 4/1999 | Arenas et al. | |
| 5,905,442 A | 5/1999 | Mosebrook et al. | |
| 5,982,103 A | 11/1999 | Mosebrook et al. | |
| 6,124,882 A | 9/2000 | Voois et al. | |
| 6,355,885 B1 | 3/2002 | Rintz et al. | |
| 6,545,434 B2 | 4/2003 | Sembhi et al. | |
| 6,660,948 B2 | 12/2003 | Clegg et al. | |
| 6,702,604 B1 | 3/2004 | Moscovitch | |
| 6,930,260 B2 | 8/2005 | Clegg et al. | |
| 6,967,565 B2 | 11/2005 | Lingemann | |
| 7,030,319 B2 | 4/2006 | Johnsen et al. | |
| 7,212,146 B2 | 5/2007 | Nakamura | |
| 7,361,853 B2 | 4/2008 | Clegg et al. | |
| 7,414,210 B2 | 8/2008 | Clegg et al. | |
| 7,432,460 B2 | 10/2008 | Clegg et al. | |
| 7,432,463 B2 | 10/2008 | Clegg et al. | |
| 7,506,450 B2 | 3/2009 | Spaulding et al. | |
| 7,528,718 B2 | 5/2009 | Adapathya et al. | |
| 7,548,160 B2 | 6/2009 | Huang et al. | |
| 7,910,849 B2 | 3/2011 | Hibshman et al. | |
| 8,020,821 B2 | 9/2011 | Chen et al. | |
| 8,067,690 B2 | 11/2011 | Anders et al. | |
| 8,149,591 B2 | 4/2012 | Feldstein et al. | |
| 8,289,192 B2 | 10/2012 | O'Donnell | |
| 8,334,459 B2 | 12/2012 | Chaumeny et al. | |
| 8,389,857 B2 | 3/2013 | Petrillo | |
| 8,599,573 B2 | 12/2013 | Wisniewski | |
| 8,695,934 B2 | 4/2014 | Jensen | |
| 8,754,816 B2 | 6/2014 | Feldstein et al. | |
| 8,854,798 B1 | 10/2014 | Mullet et al. | |
| 9,019,222 B2 | 4/2015 | Sie et al. | |
| 9,204,258 B2 | 12/2015 | Chen et al. | |
| 9,223,323 B2 | 12/2015 | Matas et al. | |
| 9,401,252 B2 | 7/2016 | Keirstead et al. | |
| 9,675,059 B2 | 6/2017 | Waldman et al. | |
| 9,679,696 B2 | 6/2017 | Bhutani et al. | |
| 9,795,014 B2 | 10/2017 | Altonen et al. | |
| 9,800,034 B2 | 10/2017 | Johnson et al. | |
| 9,818,559 B2 | 11/2017 | Tress et al. | |
| 9,955,594 B2 | 4/2018 | Sugiyama et al. | |
| 9,965,047 B2 | 5/2018 | Kirkpatrick et al. | |
| 9,978,547 B1 | 5/2018 | Wisniewski et al. | |
| 10,039,173 B2 | 7/2018 | Fultz | |
| 10,062,249 B1 * | 8/2018 | Modi | G08B 29/046 |
| 10,066,820 B2 | 9/2018 | Johnson | |
| 10,123,400 B2 | 11/2018 | Spira | |
| 10,181,385 B2 | 1/2019 | Bhate et al. | |
| 10,282,958 B2 | 5/2019 | Shuster | |
| 10,665,405 B2 | 5/2020 | Hopkins | |
| 10,678,344 B2 | 6/2020 | Kirkpatrick et al. | |
| 10,707,014 B2 | 7/2020 | Bhutani et al. | |
| 10,782,188 B2 | 9/2020 | Shivell et al. | |
| 10,923,889 B2 | 2/2021 | Wisniewski | |
| 10,925,135 B2 | 2/2021 | Slivka et al. | |
| 10,943,749 B2 | 3/2021 | Wisniewski | |
| 11,069,490 B2 | 7/2021 | Dimberg et al. | |
| 11,094,482 B2 | 8/2021 | Bhate et al. | |
| 11,140,756 B2 | 10/2021 | Spira | |
| 11,308,244 B2 | 4/2022 | Tucker | |
| 11,337,074 B2 | 5/2022 | Gulick, Jr. et al. | |
| 2003/0075351 A1 | 4/2003 | Chang | |
| 2003/0227406 A1 | 12/2003 | Armstrong | |
| 2004/0123161 A1 | 6/2004 | Harada et al. | |
| 2004/0123503 A1 | 7/2004 | Pitzen | |
| 2005/0033546 A1 | 2/2005 | Hamaguchi et al. | |
| 2005/0248930 A1 | 11/2005 | Naval et al. | |
| 2006/0031180 A1 * | 2/2006 | Tamarkin | G06Q 50/06 |
| | | | 705/412 |
| 2006/0066151 A1 | 3/2006 | Hatemata | |
| 2007/0035391 A1 | 2/2007 | Hamzy | |
| 2007/0040678 A1 | 2/2007 | Kojo | |
| 2007/0046463 A1 | 3/2007 | Tsai | |
| 2007/0102601 A1 | 5/2007 | Thompson | |
| 2007/0103300 A1 | 5/2007 | Peng | |
| 2007/0241929 A1 | 10/2007 | Marchetto | |
| 2007/0272044 A1 | 11/2007 | Huang | |
| 2007/0273509 A1 | 11/2007 | Gananathan | |
| 2008/0079576 A1 | 4/2008 | Adapathya et al. | |
| 2008/0210653 A1 * | 9/2008 | Brendel | B66C 13/40 |
| | | | 340/13.25 |
| 2008/0247125 A1 | 10/2008 | Davenport et al. | |
| 2009/0224914 A1 | 9/2009 | Wehrenberg | |
| 2009/0249497 A1 | 10/2009 | Fitzgerald et al. | |
| 2011/0140897 A1 * | 6/2011 | Purks | A61B 5/22 |
| | | | 73/379.04 |
| 2012/0032834 A1 * | 2/2012 | Weeks | G01S 7/003 |
| | | | 726/36 |
| 2012/0060606 A1 | 3/2012 | Lakich et al. | |
| 2012/0268901 A1 | 10/2012 | Jeschko | |
| 2015/0083615 A1 | 3/2015 | Lay et al. | |
| 2016/0041584 A1 | 2/2016 | Desilva et al. | |
| 2016/0246328 A1 | 8/2016 | Christie, II | |
| 2016/0300478 A1 | 10/2016 | Kubis et al. | |
| 2020/0193534 A1 | 6/2020 | Vick et al. | |
| 2020/0326789 A1 | 10/2020 | Kirkpatrick et al. | |
| 2021/0327176 A1 | 10/2021 | Baumgarte | |
| 2022/0304128 A1 | 9/2022 | Van De Sluis et al. | |
| 2024/0215895 A1 * | 7/2024 | Franck | A61B 5/341 |

FOREIGN PATENT DOCUMENTS

| | | |
|---|---|---|
| CN | 208806192 U | 4/2019 |
| CN | 209843565 U | 12/2019 |
| CN | 211238057 U | 8/2020 |
| CN | 213303936 U | 5/2021 |
| FR | 2700369 B1 | 3/1995 |
| GB | 2229487 A | 9/1990 |
| WO | 2020202319 A1 | 10/2020 |

OTHER PUBLICATIONS

"Nlight Air: A Wireless Lighting Control Solution that is finally Easy", Acuity Controls, available at least as early as Dec. 21, 2022, 4 pages.

"Nlight AIR—Because your time Matters", Acuity Controls, available at least as early as Dec. 21, 2022, 2 pages.

"NLight AIR rPODB: Barttery Powered. Wall Switch", Acuity Controls, 2021, 2 pages.

"NLight Air Simplified Wireless Lighting Controls", Acuity Controls, available at least as early as Dec. 21, 2022, 2 pages.

"Rocker Pad (Single, Double)", Installation Guide, Models: ESRP, EDRP, 2014, 2 pages.

"Wireless Sensor & Switch", Acuity Controls, 2016, 7 pages.

"Xcella Wireless Remote Module Setup Pairing Guide", Xcella, Mar. 11, 2015, 6 pages.

"XCella Wireless Handled Remote", Acuity Controls, 2015, 4 pages.

U.S. Appl. No. 17/526,794, "Advisory Action", Aug. 2, 2022, 3 pages.

U.S. Appl. No. 17/526,794, "Final Office Action", May 23, 2022, 6 pages.

U.S. Appl. No. 7/526,794 , "Non-Final Office Action", Feb. 8, 2022, 14 pages.

"Office Action", U.S. Pat. No. 3,218,599, Dec. 23, 2024, 4 pages.

* cited by examiner

WALL-MOUNTED CONTROLLER WITH ANTI-TAMPER FEATURE

BACKGROUND

Unless otherwise indicated herein, the materials described in this section are not prior art to the claims in this application and are not admitted to being prior art by inclusion in this section.

Wireless controllers are used to control one or more parameters of a variety of electrical devices such as, but not limited to, fans, lights, or the like. Wireless controllers are becoming particularly desired due to the reduction in installation costs since they can eliminate the need to run wires between traditional switches and controllers. In some applications, it is desirable for the wireless controller to have the size and/or appearance of a traditional wall mounted switch.

Handheld wireless controllers can become misplaced or lost resulting in loss of operational control for the controlled system or device. In some cases, handheld wireless controllers may be misappropriated and repurposed for use with an unrelated device or system.

SUMMARY

Apparatuses and methods for providing a wall-mounted controller having anti-tamper features are provided.

According to various aspects there is provided a controller. In some aspects, the controller may include a sensor configured to obtain and store acceleration samples corresponding to an orientation of the controller; a transceiver configured to wirelessly transmit messages to one or more devices controlled by the controller; and a processor in communication with the sensor and the transceiver and configured to control overall operation of the controller.

The processor may be configured to read the stored acceleration samples from the sensor, determine whether the stored acceleration samples read from the sensor are within a specified range, and cause the controller to change from a normal operating mode to an anti-tamper mode when more than one of the read acceleration samples are not within the specified range. In the anti-tamper mode the processor may be configured to control the transceiver to inhibit wireless transmission of messages to the one or more devices controlled by the controller.

According to various aspects there is provided a method of operating a controller. In some aspects, the method may include obtaining calibration data for a mounting orientation of the controller operating in a calibration mode based on obtaining first acceleration samples from a sensor; obtaining second acceleration samples from the acceleration sensor when a control switch is activated with the controller operating in a normal operating mode; performing a comparison of the second acceleration samples to the calibration data; based on the comparison, determining whether more than one of the second acceleration samples is not within a specified range; and in response to determining that more than one of the second acceleration samples is not within the specified range, causing the controller to operate in an anti-tamper mode.

According to various aspects there is provided non-transitory computer readable medium having stored therein instructions for making one or more processors execute a method for operating a controller. In some aspects, the instructions may include obtaining calibration data for a mounting orientation of the controller operating in a calibration mode based on obtaining first acceleration samples from an acceleration sensor; obtaining second acceleration samples from the acceleration sensor when a control switch is activated with the controller operating in a normal operating mode; performing a comparison of the second acceleration samples to the calibration data; based on the comparison, determining whether more than one of the second acceleration samples is not within a specified range; and in response to determining that more than one of the second acceleration samples is not within the specified range, causing the controller to operate in an anti-tamper mode.

Numerous benefits are achieved by way of the various embodiments over conventional techniques. For example, the various implementations provide anti-tamper features to prevent unauthorized removal of the controller from a mounted position, for example, on a wall or podium. In some implementations, the anti-tamper features may disable the controller's wireless communication. In other embodiments, the anti-tamper features may additionally or alternatively provide an alarm signal indicating that the controller has been moved from its installed location. These and other embodiments along with many of the advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

While certain implementations are described, these implementations are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

According to aspects of the present disclosure, a wall-mounted controller configured to transmit wireless messages to controlled devices for controlling a room environment (e.g., lighting, HVAC, window shades, etc.) can function when installed in its fixed mounting location, for example, but not limited to, on a wall or a podium. The wall-mounted controller will not function when removed from its mounting location, for example, while being held in a user's hand. The wall-mounted controller may be equipped with a solid-state acceleration sensor such as an accelerometer which can detect the wall-mounted controller's fixed orientation and/or any movement of the wall-mounted controller. As used herein, the term "wall-mounted controller" can refer to a controller mounted in any fixed location.

The wall-mounted controller may initially be configured to function when mounted within a specified angle, for example, but not limited to, 5 degrees of absolute plumb. As used herein, the term "plumb" refers to either a straight vertical orientation when the wall-mounted controller has the default installation orientation calibration, or a custom installation orientation calibrated by a user. The actual mounting orientation can be calibrated automatically when the station is commissioned. Orientation calibration can also be initiated manually by the user, for example, through a specific button press sequence, a graphical user interface, or remotely through a mobile app or computer software. The ability to calibrate the mounting orientation setting allows the station to accommodate a variety of real-world installation conditions, for example, but not limited to, mounting on a sloped wall or on a podium surface.

Figure 1A:
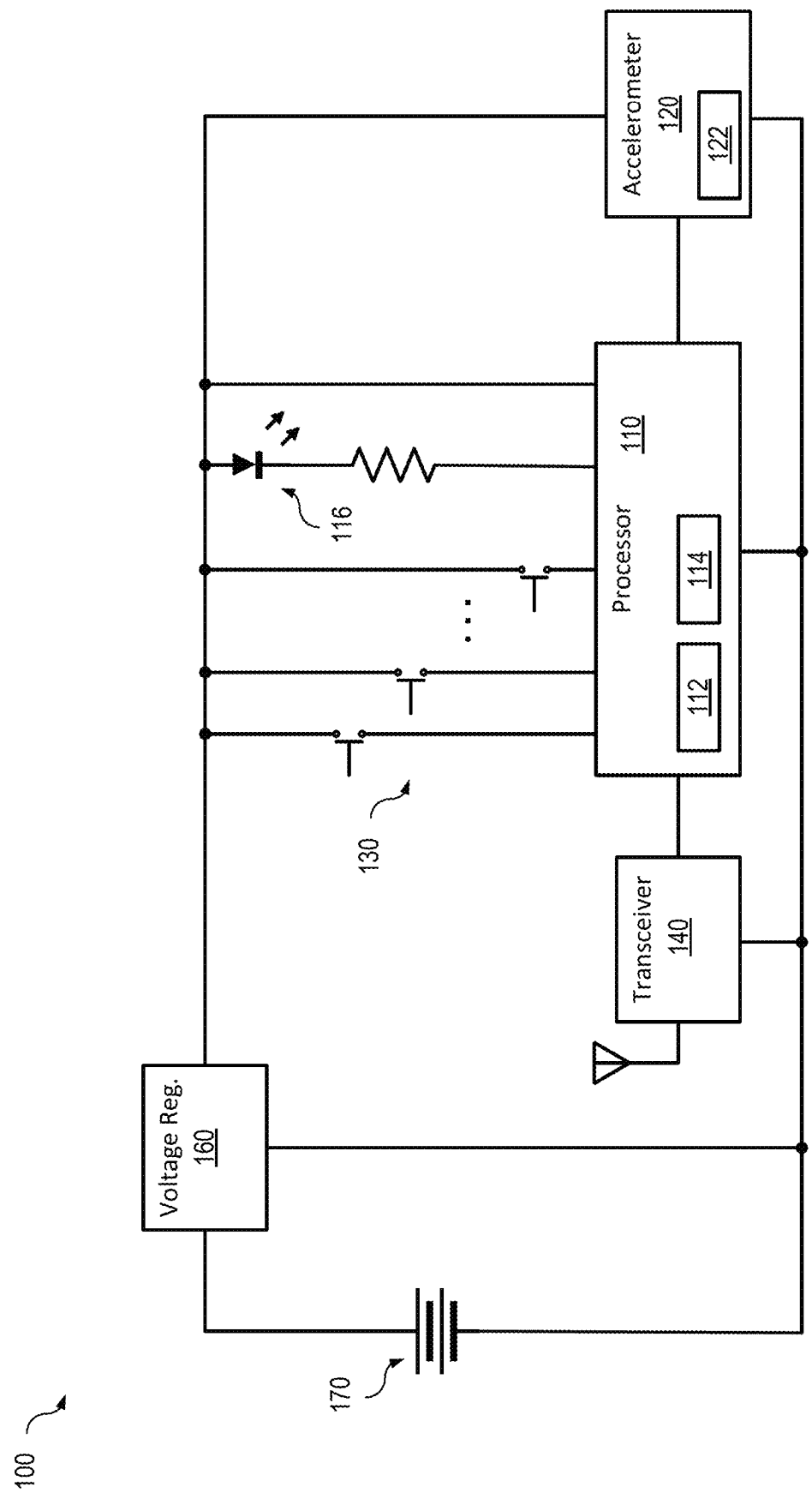
FIG. 1A is a block diagram of an example of a wall-mounted controller including anti-tamper features according to some aspects of the present disclosure.

FIG. 1A is a block diagram of an example of a wall-mounted controller 100 including anti-tamper features according to some aspects of the present disclosure. Referring to FIG. 1A, the wall-mounted controller 100 may include a processor 110, a sensor 120, and a set of control switches 130. The processor 110 may be a microprocessor, microcomputer, microcontroller, programmable controller, or other programmable device. The processor 110 may be in communication with accelerometer 120, the transceiver 140, and the control switches 130. The processor 110 may implement one or more timers, for example, a 60 second timer and a three minute timer. Alternatively, the one or more timers may be implemented in software or by hardware external to the processor 110. The processor 110 may control overall operation of the wall-mounted controller 100. The processor 110 may also control any indicator, for example, but not limited to, a light-emitting diode (LED) 116 to provide an indication of the status of the wall-mounted controller 100.

The processor 110 may include memory including random-access memory (RAM) 112 and/or flash memory 114 that may be accessed by or operated upon by the processor 110. In some implementations, the memory may be incorporated into the processor 110. In some implementations, the memory may be separate from the processor 110.

The control switches 130 may be mechanical micro-switches such as momentary micro-switches. The control switches 130 may be activated by buttons on the wall-mounted controller 100. In some implementations, the control switches 130 may be implemented as aspects of a touchscreen Graphical User Interface (GUI) or as solid-state touch sensitive areas implemented using capacitive or inductive touch sensing technologies. The control switches 130 may be configured to provide inputs to the processor 110 that are interpreted by the processor 110 for controlling the room environment (e.g., lighting, HVAC, window shades, etc.).

The transceiver 140 may represent one or more components configured to facilitate a network connection and may include wireless interfaces. The transceiver 140 may transmit messages to controlled devices for controlling a room environment (e.g., lighting, HVAC, window shades, etc.) The wireless interfaces may include, for example, wireless interfaces such as IEEE 802.11, IEEE 802.15.4, Bluetooth, or radio interfaces for accessing cellular telephone networks (e.g., transceiver/antenna for accessing a CDMA, GSM, UMTS, or another mobile communications network). Other wireless communications interfaces may be used without departing from the scope of the present disclosure.

The sensor 120 may be a solid-state or electromechanical acceleration sensor for example, but not limited to, a piezo-electric accelerometer, a micro-electromechanical systems (MEMS) accelerometer such as a capacitive accelerometer, a three-axis accelerometer, a two-axis accelerometer, a one-axis accelerometer, an orientation sensor, a gyroscopic sensor, or a tilt sensor, or other solid-state accelerometer. In some implementations, a global positioning system (GPS) receiver may alternatively or additionally be used to detect motion of the wall-mounted controller.

The sensor 120 may be referred to herein as the accelerometer 120. The accelerometer 120 may be, for example, a three-axis accelerometer such as an LIS2DW12 accelerometer from STMicroelectronics or another three-axis accelerometer. In some implementations, a two-axis or single-axis accelerometer, or a combination of multiple single-axis accelerometers, may be used.

The accelerometer 120 may include a First-In-First-Out (FIFO) buffer 122 and may communicate with the processor 110 over an Inter-Integrated Circuit (I2C) communication bus or other communication bus for configuration of the wall-mounted controller and accelerometer sample collection. The FIFO buffer 122 may be implemented as an integrated element of the accelerometer component, as an integrated element of the processor 110, or as a separate component.

The accelerometer 120 may be configured to continuously sample acceleration of the wall-mounted controller 100 in the X, Y, and Z axes at a sample rate and resolution determined according to the operational mode of the wall-mounted controller 100. The accelerometer 120 may be further configured to store the acceleration samples in the FIFO buffer 122. The FIFO buffer 122 may be configured to store 32 acceleration samples or another number of acceleration samples. In some implementations, the acceleration data may be an absolute orientation of the wall-mounted controller 100. When a button is pressed to activate a control switch 130 on the wall-mounted controller 100, the processor 110 may read out the acceleration data in the FIFO buffer 122 to determine whether the wall-mounted controller 100 has moved and may initiate an appropriate response based on the movement determination.

Figure 1B:
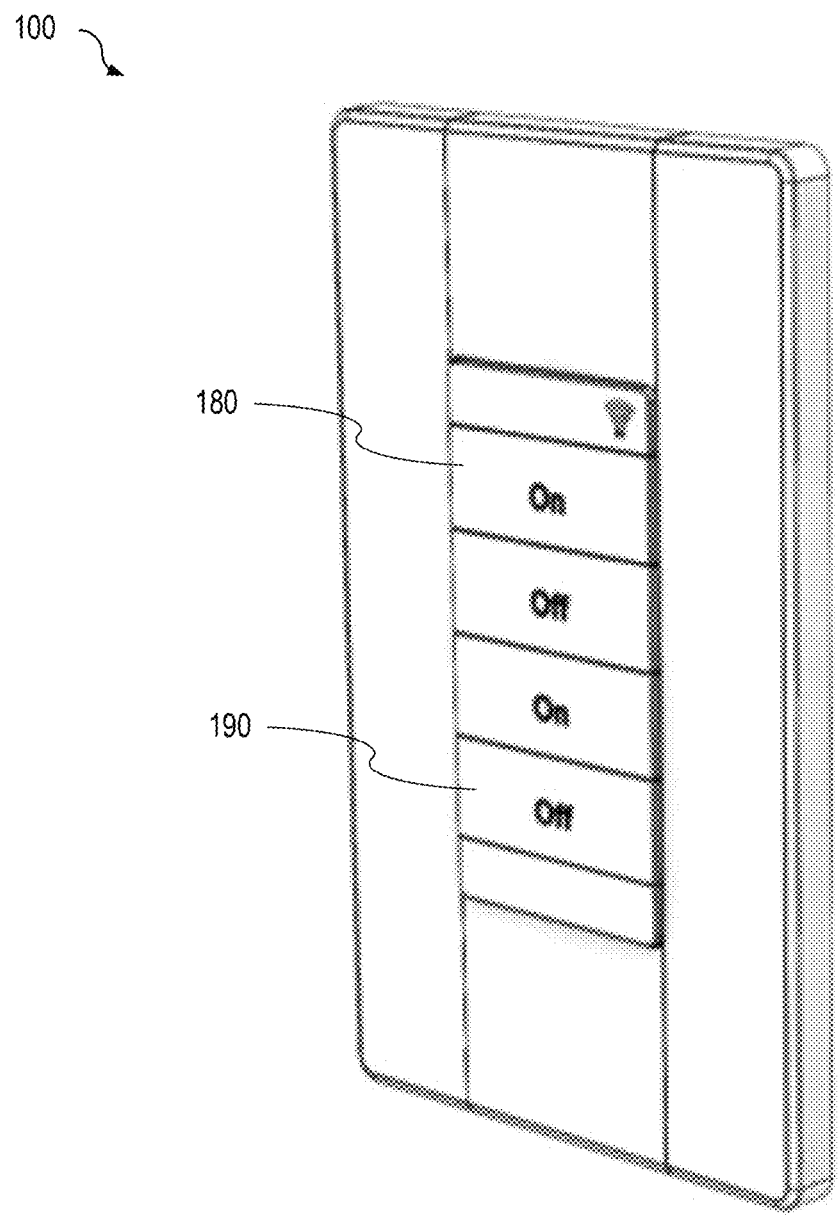
FIG. 1B is a diagram illustrating an example of a button layout for the wall-mounted controller according to some aspects of the present disclosure.

The wall-mounted controller's setting for "plumb" orientation after installation may be calibrated automatically when the wall-mounted controller is commissioned and can also be calibrated manually by the user through a specific button press sequence. FIG. 1B is a diagram illustrating an example of a button layout for the wall-mounted controller 100 according to some aspects of the present disclosure. Other button layouts may be used without departing from the scope of the present disclosure.

Referring to FIG. 1B, the wall-mounted controller's setting for "plumb" orientation may be calibrated manually, for example, by pressing and holding the upper-most button 180 and the bottom-most button 190 simultaneously for at least 10 seconds during normal operation. The wall-mounted controller 100 can also be calibrated manually using the specific button press sequence during a 3-minute window after the wall-mounted controller's processor has rebooted (e.g., after a battery replacement).

The wall-mounted controller 100 may further include a power supply such as one or more energy storage components 170 and a voltage regulator 160. The one or more energy storage components 170 may be, for example, alkaline batteries, nickel metal hydride (NiMH) batteries, lithium-ion batteries, or other types of batteries. In some implementation, the energy storage components may alternatively or additionally be a capacitor, a supercapacitor, an inductor, or other energy storage components. The voltage regulator 160 may regulate the voltage provided by the one or more energy storage components 170 to a voltage or voltages suitable for operation of the processor 110, accelerometer 120, and transceiver 140. The energy storage component(s) may be rechargeable via any of variety of known charging technologies.

In some implementations, the wall-mounted controller 100 may receive alternating current (AC) power from the installation site. In such implementations, the wall-mounted controller 100 may include power conversion circuitry (not shown) to convert the AC power to DC power suitable for operation of the wall-mounted controller and power loss detection circuitry (not shown) configured to provide an indication that AC power is lost such as when the wall-mounted controller 100 is removed from its mounting.

Figure 2:
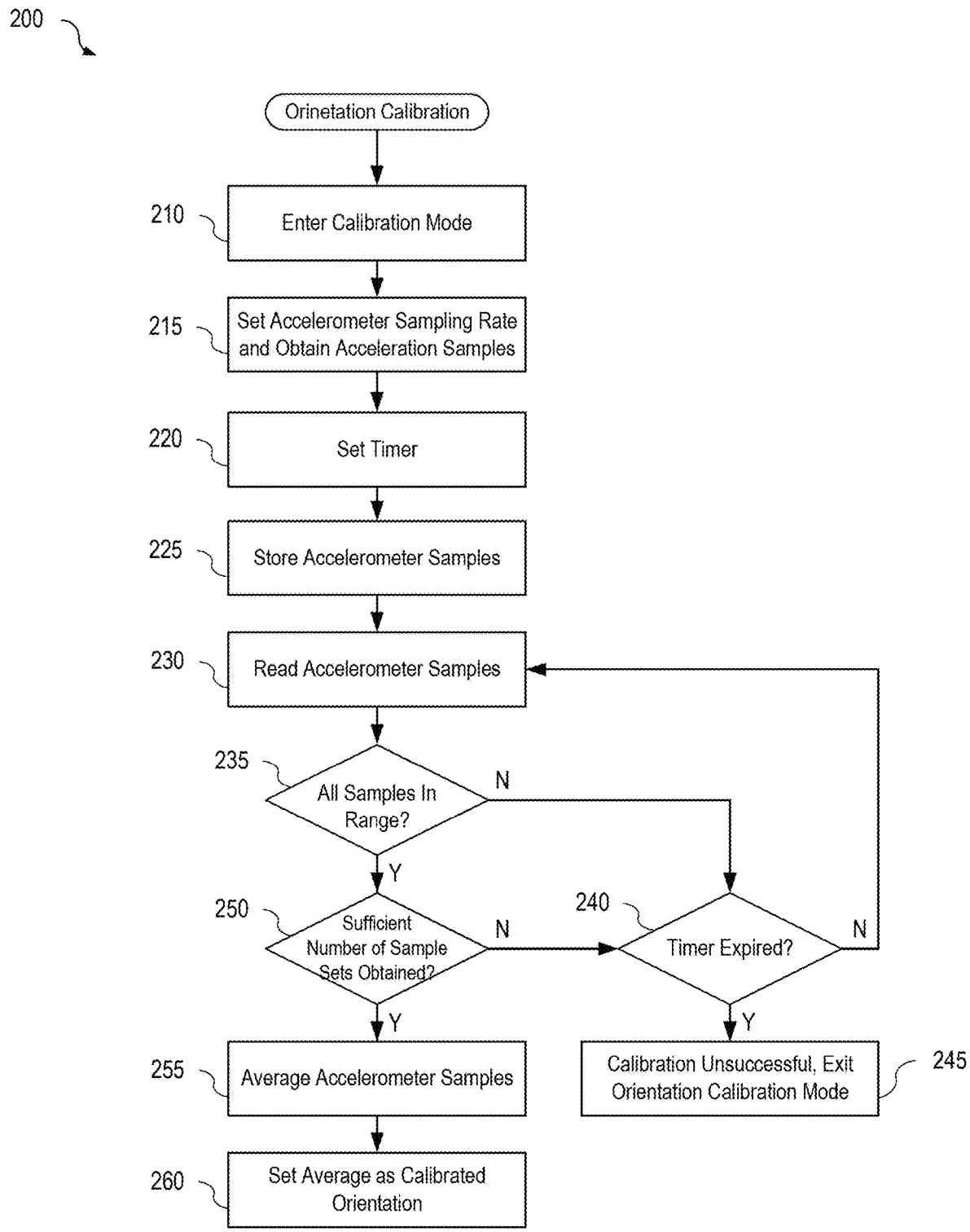
FIG. 2 is a flowchart illustrating an example of a method for operation of a wall-mounted controller in orientation calibration mode according to some aspects of the present disclosure.

FIG. 2 is a flowchart illustrating an example of a method 200 for operation of a wall-mounted controller in orientation calibration mode according to some aspects of the present disclosure. At block 210, the wall-mounted controller may enter orientation calibration mode.

Orientation calibration mode may be entered upon initial power-up of the wall-mounted controller during commissioning. Alternatively, orientation calibration mode may be entered by a specified button press sequence during normal operation or anti-tamper mode operation. For example, pressing and holding the top-leftmost and bottom-rightmost buttons simultaneously for at least 10 seconds may cause the wall-mounted controller to enter an orientation calibration mode. Other key sequences may be specified for manually entering the orientation calibration mode without departing from the scope of the present disclosure. The processor (e.g. the processor 110) of the wall-mounted controller may cause the indicator (e.g., the LED 116) to blink slowly indicating that the wall-mounted controller is in the orientation calibration mode.

At block 215, the accelerometer sampling rate and resolution may be set for the orientation calibration mode, and acceleration samples may be obtained by the accelerometer (e.g., the accelerometer 120). In orientation calibration mode, the processor (e.g., the processor 110) may cause the sampling rate and resolution of the accelerometer (e.g., the accelerometer 120) to be set to a sampling rate and resolution higher than the sampling rate and resolution set during normal operation of the wall-mounted controller. For example, the accelerometer sampling rate may be set to 12.5 Hz and the resolution set to 14-bits. The sampling rate and resolution for the accelerometer in orientation calibration mode may both be higher than the sampling rate and resolution in the normal operating mode of the wall-mounted controller. Other sampling rates and/or resolutions may be used without departing from the scope of the present disclosure. Acceleration samples of the wall-mounted controller 100 in the X, Y, and Z axes may be obtained at the set sampling rate and resolution.

At block 220, a timer may be set. The processor 110 may implement a timer, for example, a three minute timer or a timer for another time duration. Alternatively, the timer may be implemented in software or by hardware external to the processor 110. The timer may be started by the processor.

At block 225, the acceleration samples may be stored by the wall-mounted controller. The acceleration samples obtained by the accelerometer may be stored in the FIFO buffer (e.g., the FIFO buffer 122). At a sampling rate of 12.5 Hz and 14 bit resolution the FIFO buffer may store 32 acceleration samples to fill the FIFO buffer every 2.56 seconds.

At block 230, the processor may read the acceleration samples from the FIFO buffer. Each time the FIFO buffer is full (e.g., when the FIFO buffer stores 32 acceleration samples), the accelerometer may issue an interrupt to the processor. Upon receiving the interrupt, the processor may read the stored set of acceleration samples (e.g., the stored 32 acceleration samples) from the FIFO buffer.

At block 235, it may be determined whether each of the acceleration samples are within a specified range. The processor may evaluate the acceleration samples to determine whether each acceleration sample in the set of acceleration samples (e.g., the 32 acceleration samples) is within a range of ±2 degrees or another range of the other acceleration samples in the set of acceleration samples.

In response to determining that each acceleration sample in the set of acceleration samples is not within the specified range (235-N), at block 240, the set of acceleration samples may be discarded, and it may be determined whether the timer has expired. In response to determining that the timer has expired (block 240-Y), at block 245, the processor may determine that the orientation calibration was unsuccessful and may cause the wall-mounted controller to exit the orientation calibration mode. The processor may also cause the indicator (e.g., the LED 116) to cease blinking indicating that the wall-mounted controller is no longer in the orientation calibration mode and the wall mounted controller may enter the normal operation mode.

In response to determining that the timer has not expired (block 240-N), the method may continue at block 230 and the processor may read a next set of acceleration samples from the FIFO buffer.

Returning to block 235, in response to determining that each acceleration sample in the set of acceleration samples is within the specified range (235-Y), at block 250, the set of acceleration samples may be stored by the processor, for example in the RAM 112, and it may be determined whether a sufficient number of acceleration sample sets have been obtained. For example, the processor may determine whether two sets of acceleration samples (e.g., 64 acceleration samples) or another number of acceleration sample sets have been obtained.

In response to determining that a sufficient number of sample sets have not been obtained (250-N), at block 240, it may be determined whether the timer has expired. In response to determining that the timer has expired (block 240-Y), at block 245, the processor may determine that the orientation calibration was unsuccessful and may cause the wall-mounted controller to exit the orientation calibration mode. The processor may also cause the indicator (e.g., the LED 116) to cease blinking indicating that the wall-mounted controller is no longer in the orientation calibration mode.

In response to determining that the timer has not expired (block 240-N), the method may continue at block 230 and the processor may read a next set of acceleration samples from the FIFO buffer.

Returning to block 250, in response to determining that a sufficient number of sample sets have been obtained (250-Y), at block 255, the acceleration samples may be averaged. The processor may average the acceleration samples in the obtained sets of acceleration samples.

At block 260, the average of the acceleration samples may be set as the new calibrated orientation. The processor may store the average of the acceleration samples, for example in the RAM 112, as the "plumb" orientation of the wall-mounted controller. The processor may also cause the indicator (e.g., the LED 116) to cease blinking indicating that the wall-mounted controller is no longer in the orientation calibration mode.

According to some aspects, orientation calibration may be performed via an application executing on a smart device, for example, a mobile phone or laptop computer. The application may communicate wirelessly, for example, via Bluetooth or another wireless technology, with the transceiver (e.g., the transceiver 140) of the wall-mounted controller to cause the controller to perform the orientation calibration.

The method 200 may be embodied on a non-transitory computer readable medium, for example, but not limited to, the memory (e.g., the RAM 112 and/or the flash memory 114) or other non-transitory computer readable medium known to those of skill in the art, having stored therein a program including processor executable instructions for making the processor or other programmable device execute the operations of the method.

The specific steps illustrated in FIG. 2 provide a particular method for operation of a wall-mounted controller in orientation calibration mode according to an implementation of the present disclosure. Other sequences of operations may also be performed according to alternative implementations. For example, alternative implementations of the present disclosure may perform the operations outlined above in a different order. Moreover, the individual operations illustrated in FIG. 2 may include multiple sub-operations that may be performed in various sequences as appropriate to the individual operation.

After commissioning and calibration, the wall-mounted controller may enter a normal operating mode. In some implementations, the wall-mounted controller may enter the normal operating mode using its default configuration upon initial power-up without commissioning and/or calibration. In the normal operating mode, the accelerometer of the wall-mounted controller may continuously monitor acceleration data to determine whether control messages should be sent to devices controlled by the wall-mounted controller.

Certain user actions, installation conditions, or electrical noise occurring during normal operation can cause the accelerometer readings to fall outside of the expected range while the wall-mounted controller is properly mounted on a wall. To reject resulting erroneous data points, the wall-mounted controller may ignore acceleration sample captured immediately before a button press and immediately after a button press. Rejecting these data points can prevent the impulse force of a 'hard' button press from falsely triggering the anti-tamper mode. In addition, any single acceleration sample which indicates a deviation outside of the expected range of "plumb" mounting may be ignored. With the wall-mounted controller removed from its calibrated mounting orientation, the processor of the wall-mounted controller may consistently detect more than one acceleration sample outside of the expected range when a button is pressed.

Figure 3:
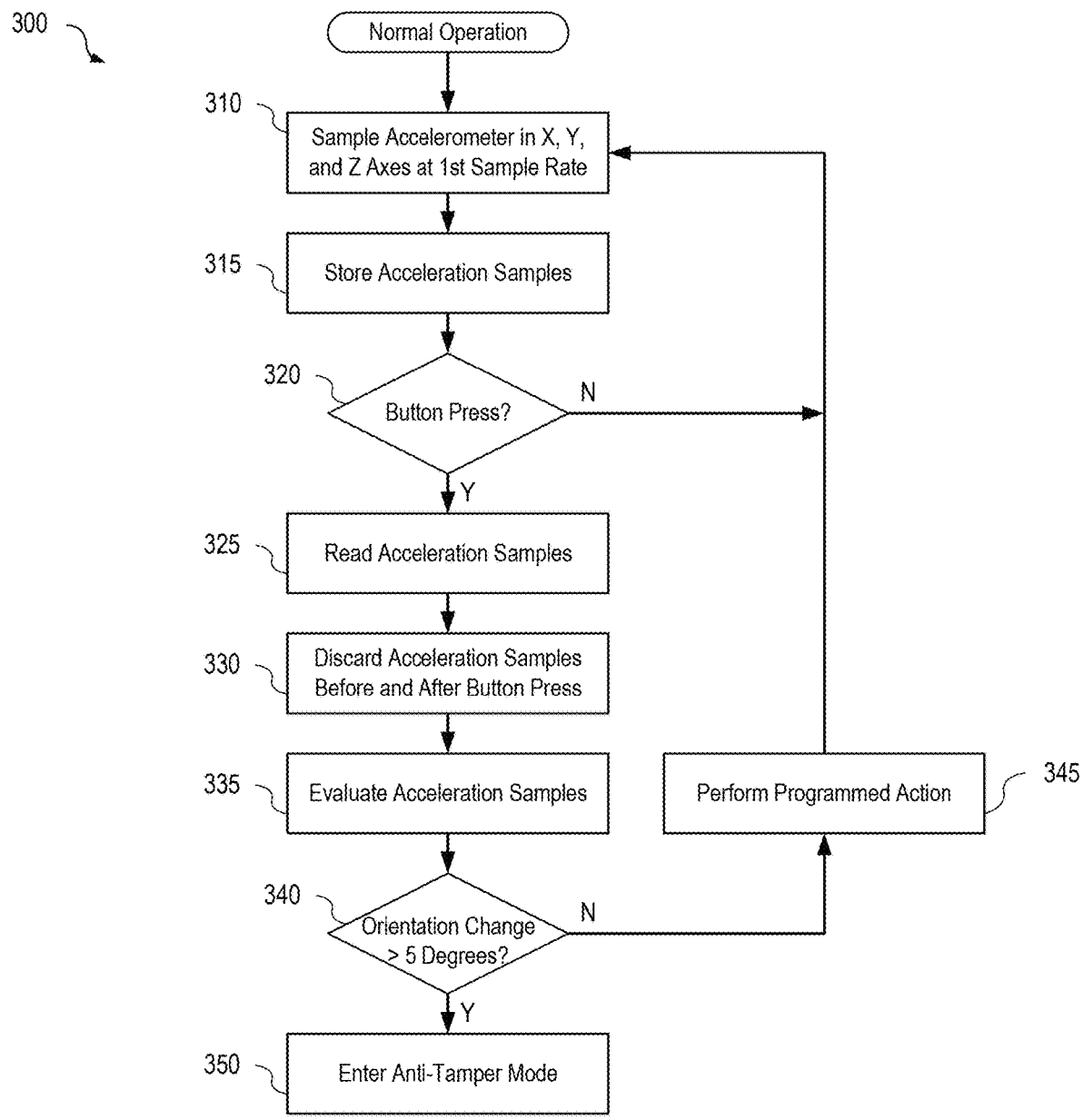
FIG. 3 is a flowchart illustrating an example of a method for operation of a wall-mounted controller in normal mode after commissioning according to some aspects of the present disclosure.

FIG. 3 is a flowchart illustrating an example of a method for operation of a wall-mounted controller in normal mode according to some aspects of the present disclosure. At block 310, the accelerometer (e.g. the accelerometer 120) may obtain acceleration samples in X, Y, and Z axes of the wall-mounted controller at a sampling rate and resolution set by the processor. For example, the processor (e.g., the processor 110) may cause the sampling rate of the accelerometer to be set for continuous sampling at 1.6 Hz at 12-bit resolution. In some implementations, the acceleration samples may be explicitly timestamped, or the sample timing may be derived from the FIFO. For example, the FIFO buffer stores the samples in an ordered list and the timing of specific samples can be derived based their position in the list, on the sampling rate, and the time at which the FIFO buffer was read. The sampling rate during normal operation may be lower than the sampling rate during calibration to conserve power thereby extending the life of the energy storage components (e.g., batteries). A higher sampling rate may be used in implementations for which energy storage component life is less of a concern.

At block 315, the acceleration samples may be stored. The acceleration samples and corresponding timestamps may be stored in a FIFO buffer (e.g., the FIFO buffer 122). At a sampling rate of 1.6 Hz and 12 bit resolution the FIFO buffer may store 32 acceleration samples spaced 0.625 seconds apart to fill the FIFO buffer every 20 seconds.

At block 320, it may be determined whether a button on the wall-mounted controller has been pressed. In response to determining that a button has not been pressed (320-N), the method may continue sampling accelerometer readings at block 310 until a button is pressed.

In response to determining that a button on the wall-mounted controller has been pressed (320-Y), at block 325, the acceleration samples stored in the FIFO buffer may be read. The processor of the wall-mounted controller may capture and store a time corresponding to the button press and may read the acceleration data from the FIFO buffer into memory (e.g., the RAM 112).

At block 330, the acceleration samples obtained immediately before and immediately after the button press may be discarded. The wall-mounted controller may ignore acceleration sample captured immediately before a button press and immediately after a button press. Rejecting these data points can prevent the impulse force of a 'hard' button press from falsely triggering the anti-tamper mode. The FIFO buffer may store the samples in an ordered list and the position or timing of specific samples can be derived based on the sampling rate and the time at which the FIFO buffer was read. Based on the timestamps of the acceleration samples, the processor may determine the acceleration samples obtained immediately before and immediately after the captured time of the button press based. An impulse force caused by a button press may result in acceleration samples immediately before and immediately after the button press providing a false indication of movement of the wall-mounted controller.

In some implementations, the number of samples before or after the button press which are ignored may be a fixed number or a user configurable setting. In some implementations, the number of samples before or after the button press which are ignored may be determined with a trained machine learning or artificial intelligence algorithm that is trained using factors such as the frequency, timing, and magnitude of the sensor readings relative to associated button presses, which may be combined with other meaningful information (e.g., time of day, day of week, etc.) and/or other usage metadata.

At block 335, the acceleration samples may be evaluated. The processor may compare the acceleration samples to the "plumb" orientation calibration data to determine a change in orientation of the wall-mounted controller. A change of more than five degrees between more than one acceleration sample and the plumb orientation calibration data may indicate a change of orientation of the wall-mounted controller.

At block 340, it may be determined whether the orientation of the wall-mounted controller has changed by more than five degrees. The processor may determine whether the orientation of the wall-mounted controller has changed by more than five degrees in any of the X, Y, or Z axes compared to the "plumb" calibration orientation. Any single acceleration sample which indicates a deviation outside of the expected range of "plumb" mounting may be ignored since the processor of the wall-mounted controller can consistently detect more than one acceleration sample outside of the expected range when a button is pressed while the wall-mounted controller is removed from its calibrated mounting orientation. In response to determining that the orientation of the wall-mounted controller has not changed by more than five degrees (340-N), at block 345, the processor may cause the wall-mounted controller to transmit a wireless message to a controlled device to perform a programmed action (e.g., turn on lights, raise window shades, etc.) corresponding to the button that was pressed. The method may continue sampling accelerometer readings at block 310.

In response to determining that the orientation of the wall-mounted controller has changed by more than five degrees (340-Y), at block 350, the processor may cause the wall-mounted controller to prevent transmission of the wireless message corresponding to the button that was pressed and may cause the wall-mounted controller to enter the anti-tamper mode. In some implementations, the processor 110 may cause the transceiver 140 to transmit a message to a central network location indicating that the wall-mounted controller 100 has moved.

The method 300 may be embodied on a non-transitory computer readable medium, for example, but not limited to, the memory (e.g., the RAM 112 and/or the flash memory 114) or other non-transitory computer readable medium known to those of skill in the art, having stored therein a program including processor executable instructions for making the processor or other programmable device execute the operations of the method.

The specific steps illustrated in FIG. 3 provide a particular method for operation of a wall-mounted controller in normal mode after commissioning according to an implementation of the present disclosure. Other sequences of operations may also be performed according to alternative implementations. For example, alternative implementations of the present disclosure may perform the operations outlined above in a different order, a different threshold may be used to determine that the device should enter anti-tamper mode, or a different selection of samples or no samples may be discarded to disregard acceptable movement of the wall-mounted controller due to user interactions with the device. Moreover, the individual operations illustrated in FIG. 3 may include multiple sub-operations that may be performed in various sequences as appropriate to the individual operation.

When the orientation of the wall-mounted controller has changed by greater than five degrees in any of the X, Y, or Z axes, the wall-mounted controller may enter the anti-tamper mode which it will increase its sensitivity to motion and will not transmit any wireless messages. The wall-mounted controller will remain in anti-tamper mode for a period of time, such as 60 seconds, after the last motion is detected. In anti-tamper mode, the processor may cause the status indicator (e.g., the status indicator LED 116) to display a pattern, for example, a one second rapid flash followed by one blink or another pattern indicating that the wall-mounted controller is in anti-tamper mode.

Figure 4:
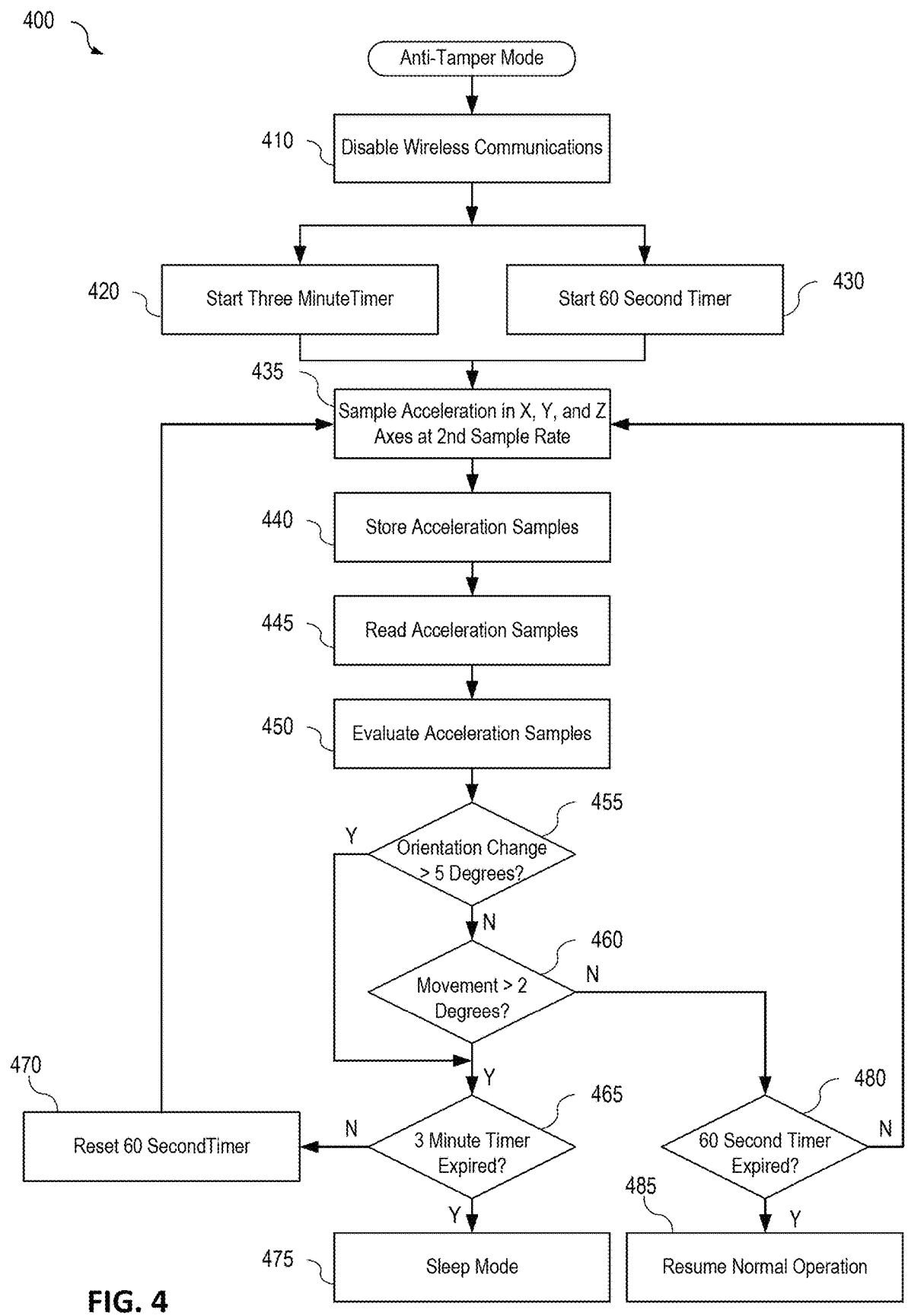
FIG. 4 is a flowchart illustrating an example of a method for operation of a wall-mounted controller in anti-tamper mode according to some aspects of the present disclosure.

FIG. 4 is a flowchart illustrating an example of a method 400 for operation of a wall-mounted controller in anti-tamper mode according to some aspects of the present disclosure. Referring to FIG. 4, at block 410, in anti-tamper mode the processor may cause the transceiver (e.g., the transceiver 140) to disable wireless communication with the controlled devices.

At block 420, the processor of the wall-mounted controller (e.g., the processor 110) may initiate a first timer. The first timer may be, for example, a three minute timer or a timer for another duration. The first timer may be implemented by the processor. Alternatively, the first timer may be implemented in software or by hardware external to the processor.

At block 430, the processor may initiate a second timer. The second timer may be, for example, a 60 second timer or a timer for another duration. The second timer may be initiated currently with the first timer. The second timer may be implemented by the processor. Alternatively, the second timer may be implemented in software or by hardware external to the processor.

At block 435, the accelerometer (e.g. the accelerometer 120) may obtain acceleration samples in X, Y, and Z axes of the wall-mounted controller at the set sampling rate and resolution, which may be higher than the sampling rate and/or resolution set for the normal operation mode. For example, the processor may cause the sampling rate of the accelerometer to be set for continuous sampling at 12.5 Hz and 14-bit resolution. Acceleration samples of the wall-mounted controller 100 in the X, Y, and Z axes may be obtained at the set sampling rate and resolution.

At block 440, the acceleration samples may be stored. The acceleration samples may be stored in a FIFO buffer (e.g., the FIFO buffer 122). At a sampling rate of 12.5 Hz and 14 bit resolution the FIFO buffer may store 32 acceleration samples to fill the FIFO buffer every 2.56 seconds.

At block 445, the processor may read the acceleration samples from the FIFO buffer. Each time the FIFO buffer is full (e.g., when the FIFO buffer stores 32 acceleration samples), the accelerometer may issue an interrupt to the processor. Upon receiving the interrupt, the processor may read the stored set of acceleration samples (e.g., the stored 32 acceleration samples) from the FIFO buffer.

At block 450, the acceleration samples may be evaluated. Each time the interrupt is triggered, the processor may evaluate the acceleration samples. Alternatively, the processor may read and evaluate the acceleration samples in response to another condition, such as a button press. The processor may compare the acceleration samples to the "plumb" orientation calibration data. A change of greater than five degrees between more than one acceleration sample and the plumb orientation calibration data may indicate movement of the wall-mounted controller.

At block 455, it may be determined whether the orientation of the wall-mounted controller has changed by more than five degrees. The processor may determine whether the orientation of the wall-mounted controller has changed by greater than five degrees in any of the X, Y, or Z axes compared to the "plumb" calibration orientation. In response to determining that the orientation of the wall-mounted controller has not changed by more than five degrees (455-N), at block 460, it may be determined whether the wall-mounted controller has moved by more than two degrees. Movement of the wall-mounted controller may be detected by a change of more than two degrees in the acceleration samples for any of the X, Y, or Z axes.

In response to determining that the wall-mounted controller has not moved by more than two degrees (460-N), at block 480, it may be determined whether the second timer (e.g., the 60 second timer) has expired. In response to determining that the second timer has not expired (480-N), the method may continue to obtain accelerometer samples at block 435. In response to determining that the second timer has expired (480-Y), at block 485 the wall-mounted controller may resume normal operation.

In response to determining that the orientation of the wall-mounted controller has changed by more than five degrees (455-Y) or the wall-mounted controller has moved by more than two degrees (460-Y), at block 465, it may be determined whether the first timer (e.g., the three minute timer) has expired. In response to determining that the first timer has not expired (465-Y), at block 470, the processor may cause the second timer (e.g., the 60 second timer) to be reset, and the method may continue to obtain acceleration samples at block 435.

In response to determining that the first timer has expired (465-Y), at block 475, the processor of the wall-mounted controller may enter a sleep mode. In sleep mode, the processor may return the accelerometer to the 1.6 Hz, 12-bit sampling configuration. When a button is next pressed, the processor will wake up and read the FIFO buffer. If the FIFO buffer is full (e.g., 32 samples have been collected), the processor may evaluate the acceleration samples and if more than one acceleration sample does not fall outside of 5 degrees of "plumb," then the wall-mounted controller will exit the anti-tamper mode and wirelessly transmit a message to a controlled device to perform a programmed action corresponding to the button that was pressed. If the FIFO buffer has not yet been filled (e.g., 32 samples have not yet been collected) or more than one sample is outside of the expected range, then the processor may restart the anti-tamper mode.

The method 400 may be embodied on a non-transitory computer readable medium, for example, but not limited to, the memory (e.g., the RAM 112 and/or the flash memory 114) or other non-transitory computer readable medium known to those of skill in the art, having stored therein a program including processor executable instructions for making the processor or other programmable device execute the operations of the method.

The specific steps illustrated in FIG. 4 provide a particular method for operation of a wall-mounted controller in anti-tamper mode after commissioning according to an implementation of the present disclosure. Other sequences of operations may also be performed according to alternative implementations. For example, alternative limitations of the present disclosure may perform the operations outlined above in a different order. Moreover, the individual operations illustrated in FIG. 4 may include multiple sub-operations that may be performed in various sequences as appropriate to the individual operation.

According to some aspects, the wall-mounted controller may transmit an alarm to an application executing on a computer or smart device, for example, a mobile phone or laptop computer indicating that the wall-mounted controller is operating in the anti-tamper mode. The wall-mounted controller may cause its transceiver (e.g., the transceiver 140) to communicate wirelessly, for example, via Bluetooth or another wireless technology, with the computer or smart device.

According to some aspects of the present disclosure, the wall-mounted controller's setting for "plumb" orientation can be calibrated manually. In one embodiment, this operation could be restricted such that it can only be triggered within a three minute window after the controller has entered a reset lockout mode after the controller processor has rebooted (e.g., after a battery replacement).

Figure 5A:
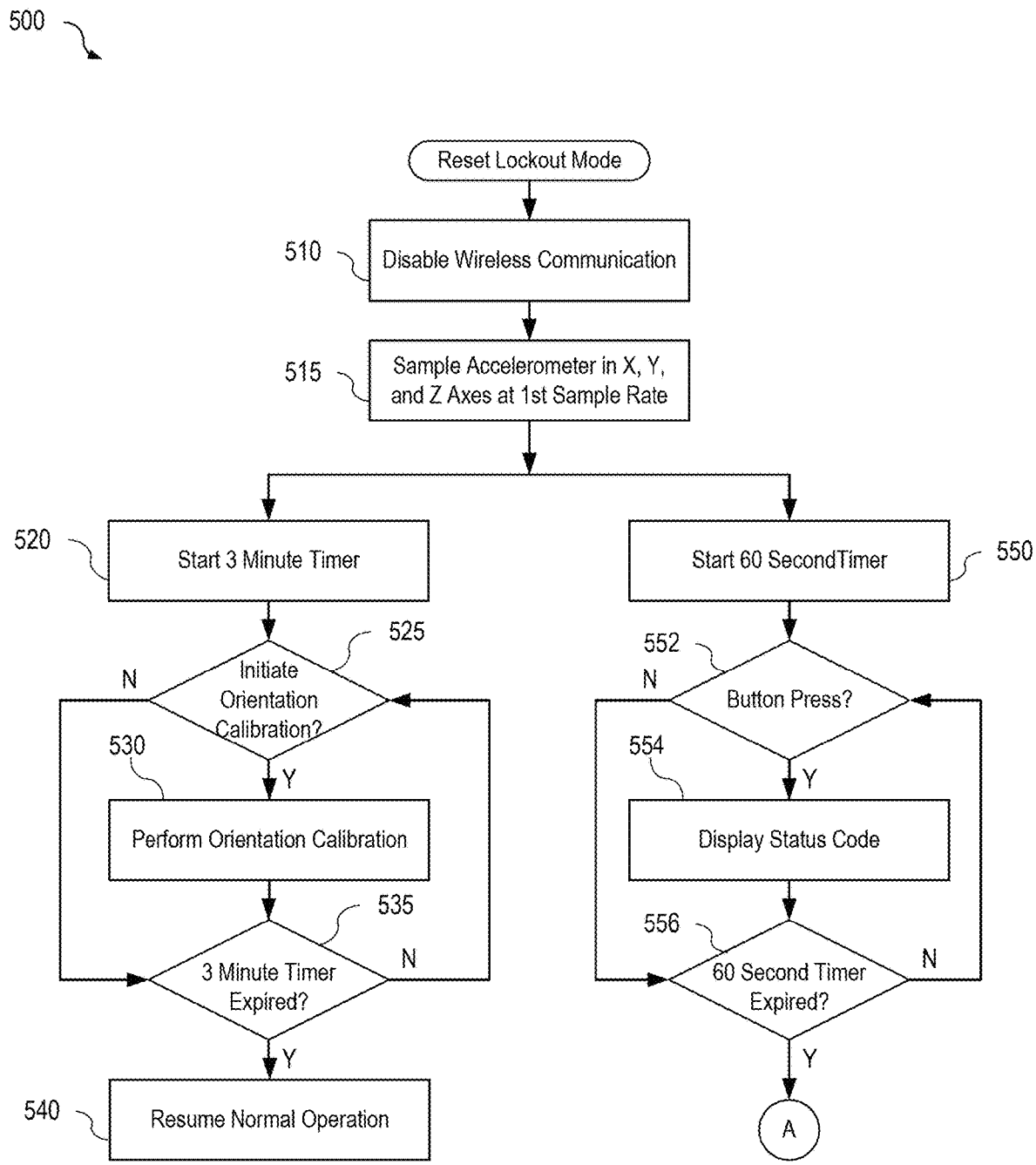
FIGS. 5A and 5B are flowcharts illustrating an example of a method for operation of a wall-mounted controller operating in a reset lockout mode after a non-software reset according to some aspects of the present disclosure.
Figure 5B:
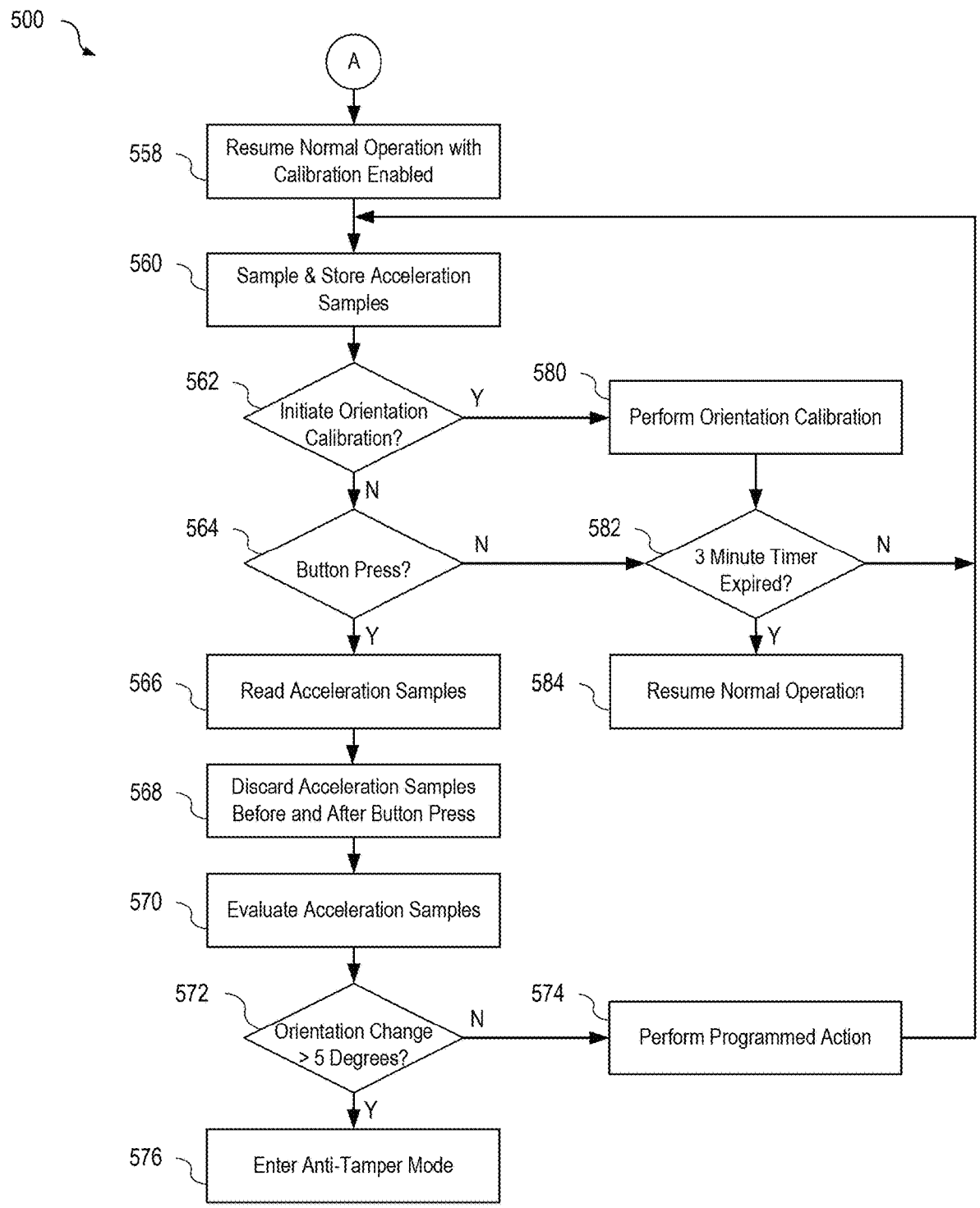

FIGS. 5A and 5B are flowcharts illustrating an example of a method 500 for operation of a wall-mounted controller operating in a reset lockout mode after a non-software reset according to some aspects of the present disclosure. At block 510, the processor of the wall-mounted controller (e.g. the processor 110) may cause the transceiver (e.g., the transceiver 140) to disable wireless communication with the controlled devices.

At block 515, the accelerometer (e.g. the accelerometer 120) may obtain acceleration samples in X, Y, and Z axes of the wall-mounted controller at a sampling rate and resolution set by the processor. For example, the processor (e.g., the processor 110) may cause the sampling rate of the accelerometer to be set for continuous sampling at 1.6 Hz at 12-bit resolution.

At block 520, the processor may initiate a first timer. The first timer may be, for example, a three minute timer or a timer for another duration. The first timer may be implemented by the processor. Alternatively, the first timer may be implemented in software or by hardware external to the processor.

At block 525, it may be determined whether orientation calibration should be performed. Manual orientation calibration may be initiated by pressing a specified key press sequence. For example, pressing and holding the top-leftmost and bottom-rightmost buttons of the wall-mounted controller simultaneously for at least 10 seconds may cause the wall-mounted controller to enter the orientation calibration mode. Other key sequences may be specified for manually entering the orientation calibration mode without departing from the scope of the present disclosure. In response to determining that the orientation calibration mode should not be initiated (525-N), the method may continue at block 535 to determine whether the first timer has expired.

In response to determining that the orientation calibration mode should be initiated (525-Y), at block 530, the processor may cause the wall-mounted control station to enter the calibration orientation mode (see FIG. 2) and orientation calibration may be performed.

At block 535, it may be determined whether the first timer has expired. In response to determining that the first timer has not expired (535-N), the method may continue monitoring for the specified key press sequence at block 525.

In response to determining that the first timer (e.g., the three minute timer) has expired (535-Y), at block 540, the wall-mounted controller may resume normal operation.

At block 550, the processor of the wall-mounted controller (e.g., the processor 110) may initiate a second timer. The second timer may be, for example, a 60 second timer or a timer for another duration. The second timer may be initiated concurrently with the first timer. The second timer may be implemented by the processor. Alternatively, the second timer may be implemented in software or by hardware external to the processor.

At block 552, it may be determined whether a button on the wall-mounted controller has been pressed. In response to determining that a button has not been pressed (552-N), at block 556, it may be determined whether the second timer (e.g., the 60 second timer) has expired. In response to determining that the second timer has not expired (556-N), the method may continue monitoring for a button press at block 552.

In response to determining that a button on the wall-mounted controller has been pressed (552-Y), at block 554, the processor may cause the status indicator (e.g., the status indicator LED 116) to display a pattern, for example, a one second rapid flash followed by two blinks or another pattern indicating that the wall-mounted controller is in the reset lockout mode, and the button press may be ignored.

At block 556, it may be determined whether the second timer has expired. In response to determining that the second timer has not expired (556-N), the method may continue monitoring for a button press at block 552.

In response to determining that the second timer (e.g., the 60 second timer) has expired (556-Y), at block 558, the wall-mounted controller may resume normal operation with calibration enabled. In the normal operation with calibration enabled mode, the wall-mounted controller may operate in the normal operation mode, for example, as described in FIG. 3, but may enter the orientation calibration mode, for example, as described in FIG. 2, upon entry of a specified key press sequence.

At block 560, the wall-mounted controller may sample and store acceleration samples. The accelerometer (e.g. the accelerometer 120) may obtain acceleration samples in X, Y, and Z axes of the wall-mounted controller at a sampling rate and resolution set by the processor. For example, the processor (e.g., the processor 110) may cause the sampling rate of the accelerometer to be set for continuous sampling at 1.6 Hz at 12-bit resolution. In some implementations, the acceleration samples may be explicitly timestamped, or the sample timing may be derived from the FIFO. For example, the FIFO buffer stores the samples in an ordered list and the timing of specific samples can be derived based their position in the list, on the sampling rate, and the time at which the FIFO buffer was read.

The acceleration samples and corresponding timestamps may be stored in a FIFO buffer (e.g., the FIFO buffer 122). At a sampling rate of 1.6 Hz and 12 bit resolution the FIFO buffer may store 32 acceleration samples spaced 0.625 seconds apart to fill the FIFO buffer every 20 seconds.

At block 562, it may be determined whether orientation calibration has been initiated. For example, the processor of the wall-mounted controller may determine whether a specified key press sequence for initiating orientation calibration has been entered. In response to determining that orientation calibration has been initiated (562-Y), at block 580 orientation calibration may be performed. For example, orientation calibration may be performed according to the method 200 illustrated in FIG. 2.

At block 582, it may be determined whether the first timer has expired. The first timer may be, for example, the three minute timer or a timer having another duration. In response to determining that the first timer has expired (582-Y), at block 584, the wall-mounted controller may resume operating in the normal operation mode. In response to determining that the first timer has not expired (582-N), the method may continue to sample and store acceleration samples at block 560.

Returning to block 562, in response to determining that orientation calibration has not been initiated (562-N), at block 564, it may be determined whether a button has been pressed on the wall-mounted controller. In response to determining that a button has not been pressed (564-N), at block 582, it may be determined whether the first timer has expired. The first timer may be, for example, the three minute timer or a timer having another duration. In response to determining that the first timer has expired (582-Y), at block 584, the wall-mounted controller may resume operating in the normal operation mode. In response to determining that the first timer has not expired (582-N), the method may continue to sample and store acceleration samples at block 560.

In response to determining that a button on the wall-mounted controller has been pressed (564-Y), at block 566, the acceleration samples stored in the FIFO buffer may be read. The processor of the wall-mounted controller may capture and store a time corresponding to the button press and may read the acceleration data from the FIFO buffer into memory (e.g., the RAM 112).

At block 568, the acceleration samples obtained immediately before and immediately after the button press may be discarded. The wall-mounted controller may ignore acceleration sample captured immediately before a button press and immediately after a button press. Rejecting these data points can prevent the impulse force of a 'hard' button press from falsely triggering the anti-tamper mode. The FIFO buffer may store the samples in an ordered list and the position or timing of specific samples can be derived based on the sampling rate and the time at which the FIFO buffer was read. Based on the timestamps of the acceleration samples, the processor may determine the acceleration samples obtained immediately before and immediately after the captured time of the button press based. An impulse force caused by a button press may result in acceleration samples immediately before and immediately after the button press providing a false indication of movement of the wall-mounted controller.

In some implementations, the number of samples before or after the button press which are ignored may be a fixed number or a user configurable setting. In some implementations, the number of samples before or after the button press which are ignored may be determined with a trained machine learning or artificial intelligence algorithm that is trained using factors such as the frequency, timing, and magnitude of the sensor readings relative to associated button presses, which may be combined with other meaningful information (e.g., time of day, day of week, etc.) and/or other usage metadata.

At block 570, the acceleration samples may be evaluated. The processor may compare the acceleration samples to the "plumb" orientation calibration data to determine a change in orientation of the wall-mounted controller. A change of more than five degrees between more than one acceleration sample and the plumb orientation calibration data may indicate a change of orientation of the wall-mounted controller.

At block 572, it may be determined whether the orientation of the wall-mounted controller has changed by more than five degrees. The processor may determine whether the orientation of the wall-mounted controller has changed by more than five degrees in any of the X, Y, or Z axes compared to the "plumb" calibration orientation. Any single acceleration sample which indicates a deviation outside of the expected range of "plumb" mounting may be ignored since the processor of the wall-mounted controller can consistently detect more than one acceleration sample outside of the expected range when a button is pressed while the wall-mounted controller is removed from its calibrated mounting orientation.

In response to determining that the orientation of the wall-mounted controller has not changed by more than five degrees (572-N), at block 574, the processor may cause the wall-mounted controller to transmit a wireless message to a controlled device to perform a programmed action (e.g., turn on lights, raise window shades, etc.) corresponding to the button that was pressed. The method may continue to sample and store accelerometer readings at block 560.

In response to determining that the orientation of the wall-mounted controller has changed by more than five degrees (572-Y), at block 576, the processor may cause the wall-mounted controller to prevent transmission of the wireless message corresponding to the button that was pressed and may cause the wall-mounted controller to enter the anti-tamper mode according to the method 400 illustrated in FIG. 4. In some implementations, the processor 110 may cause the transceiver 140 to transmit a message to a central network location indicating that the wall-mounted controller 100 has moved.

The method 500 may be embodied on a non-transitory computer readable medium, for example, but not limited to, the memory (e.g., the RAM 112 and/or the flash memory 114) or other non-transitory computer readable medium known to those of skill in the art, having stored therein a program including processor executable instructions for making the processor or other programmable device execute the operations of the method.

The specific steps illustrated in FIG. 5 provide a particular method for operation of a wall-mounted controller operating in a reset lockout mode after a non-software reset after commissioning according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 5 may include multiple sub-operations that may be performed in various sequences as appropriate to the individual operation.

While specific accelerometer sampling rates and resolutions as well as FIFO buffer sizes have been provided for purposes of explanation, other accelerometer sampling rates and resolutions and FIFO buffer sizes may be used without departing from the scope of the present disclosure. Similarly, a different number of angular thresholds or timers, or different angular threshold values or timer values may be selected as needed for a specific implementation without departing from the scope of the disclosure.

While implementations of the disclosed anti-tamper features have been described with respect to a wall-mounted controller, it should be appreciated that the anti-tamper features of the present disclosure may be utilized in other implementations. For example, mobile devices that are easily moved may benefit from the disclosed anti-tamper features to provide an indication to unauthorized movement of the device. Similarly, the anti-tamper features of the present disclosure may be implemented in larger pieces of equipment, for example, but not limited to office equipment (e.g., computers, printers, copiers, etc.) to indicate unauthorized movement of the equipment.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A controller, the controller comprising:
a sensor configured to obtain and store acceleration samples corresponding to an orientation of the controller;
a transceiver configured to wirelessly transmit messages to one or more devices controlled by the controller; and
a processor in communication with the sensor and the transceiver and configured to control overall operation of the controller,
wherein the processor is configured to:
read the stored acceleration samples from the sensor,
determine whether the stored acceleration samples read from the sensor are within a specified range, and
cause the controller to change from a normal operating mode to an anti-tamper mode when more than one of the read acceleration samples are not within the specified range, wherein in the anti-tamper mode the processor is configured to control the transceiver to inhibit wireless transmission of a message in response to activation of a control switch on the controller to the one or more devices controlled by the controller.

2. The controller of claim 1, wherein the sensor comprises one or more of: a three-axis accelerometer, a two-axis accelerometer, a one-axis accelerometer, an orientation sensor, a gyroscopic sensor, or a tilt sensor.

3. The controller of claim 1, herein the control switch is at least one of a set of control switches configured to provide inputs to the processor for controlling the one or more devices controlled by the controller, wherein the processor is further configured to:
when the control switch of the set of control switches is activated, read the stored acceleration samples from the sensor; and
determine whether more than one of the read acceleration samples is not within the specified range by comparing the read acceleration samples to stored acceleration data corresponding to an initial orientation of the controller.

4. The controller of claim 3, wherein the processor is further configured to ignore the read acceleration samples obtained immediately before and immediately after the control switch is activated.

5. The controller of claim 3, wherein a read acceleration sample is not within the specified range when the read acceleration sample exceeds the stored acceleration data by more than five degrees.

6. The controller of claim 1, wherein the processor is further configured to set a first sampling rate for the sensor to obtain acceleration samples during the normal operating mode of the controller and set a second sampling rate higher than the first sampling rate when the controller is in the anti-tamper mode.

7. A method of operating a controller, the method comprising:
obtaining, by a processor of the controller, calibration data for a mounting orientation of the controller operating in a calibration mode based on obtaining first acceleration samples from an acceleration sensor;
obtaining, by the processor of the controller, second acceleration samples from the acceleration sensor when a control switch is activated with the controller operating in a normal operating mode;
performing, by the processor of the controller, a comparison of the second acceleration samples to the calibration data;

based on the comparison, determining, by the processor of the controller, whether more than one of the second acceleration samples is not within a specified range; and in response to determining that more than one of the second acceleration samples is not within the specified range, causing the controller to operate in an anti-tamper mode, wherein in the anti-tamper mode, inhibiting, by the processor of the controller, transmission of a wireless message in response to activation of the control switch to one or more devices controlled by the controller.

8. The method of claim 7, wherein obtaining the calibration data for the mounting orientation comprises averaging the first acceleration samples.

9. The method of claim 7, wherein an acceleration sample of the second acceleration samples is not within the specified range when the acceleration sample exceeds the calibration data by more than five degrees.

10. The method of claim 7, wherein determining whether more than one of the second acceleration samples is not within the specified range comprises ignoring the second acceleration samples obtained immediately before and immediately after the control switch is activated.

11. The method of claim 7, wherein operation in the anti-tamper mode or in the calibration mode comprises increasing a sampling rate for obtaining acceleration samples to a sampling rate higher than a sampling rate for obtaining acceleration samples during operation in the normal operating mode.

12. The method of claim 7, wherein operation in the anti-tamper mode further comprises determining movement of the controller by determining a change of more than two degrees between acceleration samples of the second acceleration samples.

13. A non-transitory computer readable medium having stored therein instructions for making one or more processors execute a method for operating a controller, the processor executable instructions comprising instructions for performing operations including:

obtaining calibration data for a mounting orientation of the controller operating in a calibration mode based on obtaining first acceleration samples from an acceleration sensor;

obtaining second acceleration samples from the acceleration sensor when a control switch is activated with the controller operating in a normal operating mode;

performing a comparison of the second acceleration samples to the calibration data;

based on the comparison, determining whether more than one of the second acceleration samples is not within a specified range; and in response to determining that more than one of the second acceleration samples is not within the specified range, causing the controller to operate in an anti-tamper mode, wherein in the anti-tamper mode, inhibiting, by the processor of the controller, transmission of a wireless message in response to activation of the control switch to one or more devices controlled by the controller.

14. The non-transitory computer readable medium as defined in claim 13, further comprising instructions for performing operations including averaging the first acceleration samples to obtain the calibration data.

15. The non-transitory computer readable medium as defined in claim 13, wherein an acceleration sample of the second acceleration samples is not within the specified range when the acceleration sample exceeds the calibration data by more than five degrees.

16. The non-transitory computer readable medium as defined in claim 13, further comprising instructions for performing operations including ignoring the second acceleration samples obtained immediately before and immediately after the control switch is activated.

17. The non-transitory computer readable medium as defined in claim 13, further comprising instructions for operation in the anti-tamper mode and the calibration mode including increasing a sampling rate for obtaining acceleration samples to a sampling rate higher than a sampling rate for obtaining acceleration samples during operation in the normal operating mode.

18. The non-transitory computer readable medium as defined in claim 13, further comprising instructions for operation in the anti-tamper mode including determining movement of the controller by determining a change of more than two degrees between acceleration samples of the second acceleration samples.

* * * * *